(12) United States Patent
Yu

(10) Patent No.: US 9,965,522 B2
(45) Date of Patent: *May 8, 2018

(54) MOBILE APPLICATION SEARCH RANKING

(71) Applicant: Google Inc., Mountain View, CA (US)

(72) Inventor: Jiayao Yu, Mamaroneck, NY (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/400,616

(22) Filed: Jan. 6, 2017

(65) Prior Publication Data

US 2017/0116201 A1    Apr. 27, 2017

Related U.S. Application Data

(63) Continuation of application No. 14/478,063, filed on Sep. 5, 2014, now Pat. No. 9,542,451.

(51) Int. Cl.
G06F 17/30 (2006.01)

(52) U.S. Cl.
CPC .... G06F 17/3053 (2013.01); G06F 17/30867 (2013.01)

(58) Field of Classification Search
CPC .......... G06F 17/3053; G06F 17/30867; G06F 17/30997
See application file for complete search history.

(56) References Cited

U.S. PATENT DOCUMENTS

| | | | |
|---|---|---|---|
| 6,285,999 B1 | 9/2001 | Page | |
| 7,437,351 B2 | 10/2008 | Page | |
| 8,151,217 B2 | 4/2012 | Lin | |
| 8,688,701 B2 * | 4/2014 | Ghosh | G06F 17/30699 706/54 |
| 9,027,105 B1 * | 5/2015 | Saylor | H04L 63/08 707/705 |
| 9,247,014 B1 * | 1/2016 | Rao | G06F 17/30979 |
| 9,542,451 B2 * | 1/2017 | Yu | G06F 17/3053 |
| 9,576,029 B2 * | 2/2017 | Berkhim | G06F 17/30616 |
| 2007/0214097 A1 | 9/2007 | Parsons et al. | |

(Continued)

OTHER PUBLICATIONS

Lunden, "Relcy Is Building a PageRank-Style Mobile App Search Engine With $9M From Khosla and Sequoia", TechCrunch Jul. 17, 2014 see techcrunch.com/2014/07/17/relcy-mobile-search U.S. Appl. No. 14/478,063.

*Primary Examiner* — Leslie Wong
(74) *Attorney, Agent, or Firm* — Shumaker & Sieffert, P.A.

(57) ABSTRACT

Disclosed is a technique for providing a linkage between applications, or other digital content, of an application store by assigning values to users of the digital content with respect to a particular user who is submitting a query for particular digital content. The technique involves receiving a query and identifying a subset of digital content based on the query and a word matching technique. For each identified digital content, users who have installed or downloaded the digital content may be determined. A reputation score, corresponding to a user's influence, and a trust score, corresponding to a degree of separation between the user who submitted the query and other users who have installed the digital content, may be computed for each of the users. A list of recommended applications may be generated based on the word matching technique, the reputation score, and the trust score.

14 Claims, 6 Drawing Sheets

(56) References Cited

U.S. PATENT DOCUMENTS

| | | |
|---|---|---|
| 2011/0191417 A1 | 8/2011 | Rathod |
| 2012/0072283 A1 | 3/2012 | Devore et al. |
| 2013/0019258 A1 | 1/2013 | Bhatia et al. |
| 2013/0073473 A1* | 3/2013 | Heath .................... G06Q 30/02 705/319 |
| 2013/0185292 A1* | 7/2013 | Li .................... G06F 17/30522 707/723 |
| 2013/0254192 A1* | 9/2013 | Work .................... G06Q 10/00 707/732 |
| 2013/0346268 A1 | 12/2013 | Pereira et al. |
| 2014/0040231 A1 | 2/2014 | Lin |
| 2014/0201681 A1 | 7/2014 | Mahaffey et al. |
| 2015/0234645 A1 | 8/2015 | Ramachandran et al. |

\* cited by examiner

MOBILE APPLICATION SEARCH RANKING

BACKGROUND

Approximately 15 years ago, the PageRank algorithm was published and essentially described a process to rank web pages based on the number of links to a particular page. A particular web page with a high number of other web pages that link to it may be regarded as more important than another web page to which few other sites point. This technique proved enormously successful in allowing an end user to rapidly discover web pages that are relevant to the user's query. PageRank has since been modified and combined with other search techniques to improve its speed and accuracy.

On mobile devices, the PageRank technique for ranking web pages operates similarly with respect to its performance on a desktop computer. Users spend an enormous amount of time on mobile devices browsing web pages and utilizing mobile applications. Many application stores maintain a word index that is associated with a particular application or other such digital content. When a user conducts a query for digital content on the application store, a word matching technique may be utilized to return a list of digital content in response to the query. The application store may rank the returned list based on a rating and/or a popularity (e.g., how many installations). The number of applications in an application store may hinder discoverability by users for specific applications.

BRIEF SUMMARY

According to an implementation, an application store server may receive one or more search terms as a request from a user. The application store server may dynamically host one or more applications or other digital content for digital distribution to devices associated with users. The application store server may determine one or more applications that are associated with the search term(s) based on a word matching technique. For each of the applications, users who have installed each application may be determined. A reputation score may be computed for each of the users. The reputation score may be an indication of an influence of a user based on, for example, a post count and/or number of followers on one or more social networking sites. A trust score may be computed for each of the users. The trust score may correspond to a degree of separation between the user who made the query and other users who have installed the applications that have been identified based on the word matching technique. A list of recommended applications may be generated based on the applications that are associated with the search term(s), the reputation score, and the trust score.

In an implementation, a system is disclosed that includes a database and a processor of an application store server communicatively coupled thereto. The database may store information pertaining to digital content and the digital content itself. The processor may be configured to receive one or more search terms as a request from a user. The processor may determine applications that are associated with the search term(s) based on a word matching technique. For each of the applications, it may determine users who have installed each of the applications identified based on the word search technique. The processor may compute a reputation score for each of the users and compute a trust score for each of the users. The processor may generate a list of recommended applications based on the applications that are associated with the one or more search terms, the reputation score, and the trust score.

A system is disclosed that includes a database and a processor of an application store communicatively coupled thereto. The data base may store digital content and an entry for information pertaining to the digital content. The processor may be configured to obtain a reputation score for each of a first group of users. The reputation score may correspond to an indication of an influence of a user based on, for example, a post count and/or number of followers for one or more social networking sites. A link may be established between each of the plurality of applications by utilizing users as a linkage between the applications by performing a series of steps. An installation base may be determined that represents which of the applications a second group of users have installed. The second group of users may include the entirety of the first group of users. A first indication of the installation base may be stored in the database for each of the applications (or other digital content) in the application store. A second indication of the reputation score for the first group of users may be stored for any of the applications that at least one member of the first group users has installed. An indication of a trust score for the second group of users may be received. A third indication of the trust score for the second group of users may be stored to the database.

In an implementation, a system according to the presently disclosed subject matter includes an application store server that includes a database and a processor. The system may include a means for receiving one or more terms as a search request from a user. The application server may dynamically hosts digital content for digital distribution to devices associated with a first group of users. The system may include a means for determining applications that are associated with the one or more search terms based on a word matching technique. For each of the applications, the system may have a means for determining a second group of users who have installed the applications identified based on the word matching technique. The system may include a means for computing a reputation score for each member of the second group of users. The reputation score may represent an indication of an influence of a user based on, for example, a post count and/or a number of followers for a social networking site. The system may include a means for computing a trust score for each of the second group of users. The trust score may correspond to a degree of separation between the user who submitted the query and each member of the second group of users. The system may include a means for generating a list of recommended applications based on the applications that are associated with the one or more search terms, the reputation score, and the trust score.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

The discoverability of applications in an application store may be similar to locating a web page prior to the PageRank technique. That is, a developer may not be able to deliver an application to the application store and have it be found by end users. The PageRank technique continues to be used as an effective mechanism for returning relevant web pages in response to a query. However, it involves ranking nodes in a linked database, which may not exist in an application store. For example, there may be no inherent linkage among applications stored to a database and accessed by an application store server. Thus, PageRank may not be directly applicable for ranking applications on an application store server.

As disclosed herein, the mobile application discoverability issue may be recast as the content discoverability issue that existed for the World Wide Web ("WWW") prior to PageRank. Unlike web pages, there are no links to connect applications on an application store. To establish links among the mobile applications or digital content of an application store the users can be utilized as hubs to connect the applications. The collection of all the users and all the applications in an application store, generally, will be a very large graph similar to the WWW. As disclosed herein, a graph may be constructed by connecting all applications on an application store through the users who install them. The graph may be utilized to generate search ranking scores for each application (or other digital content). The score may be generated based on a combination of the reputation of the users who installed the application and their relationship to the user who is performing the search. While implementations are discussed and examples are provided in terms of one or more applications, other forms of digital content may discovered by employing similar devices, systems, and/or methods disclosed herein.

Figure 1:
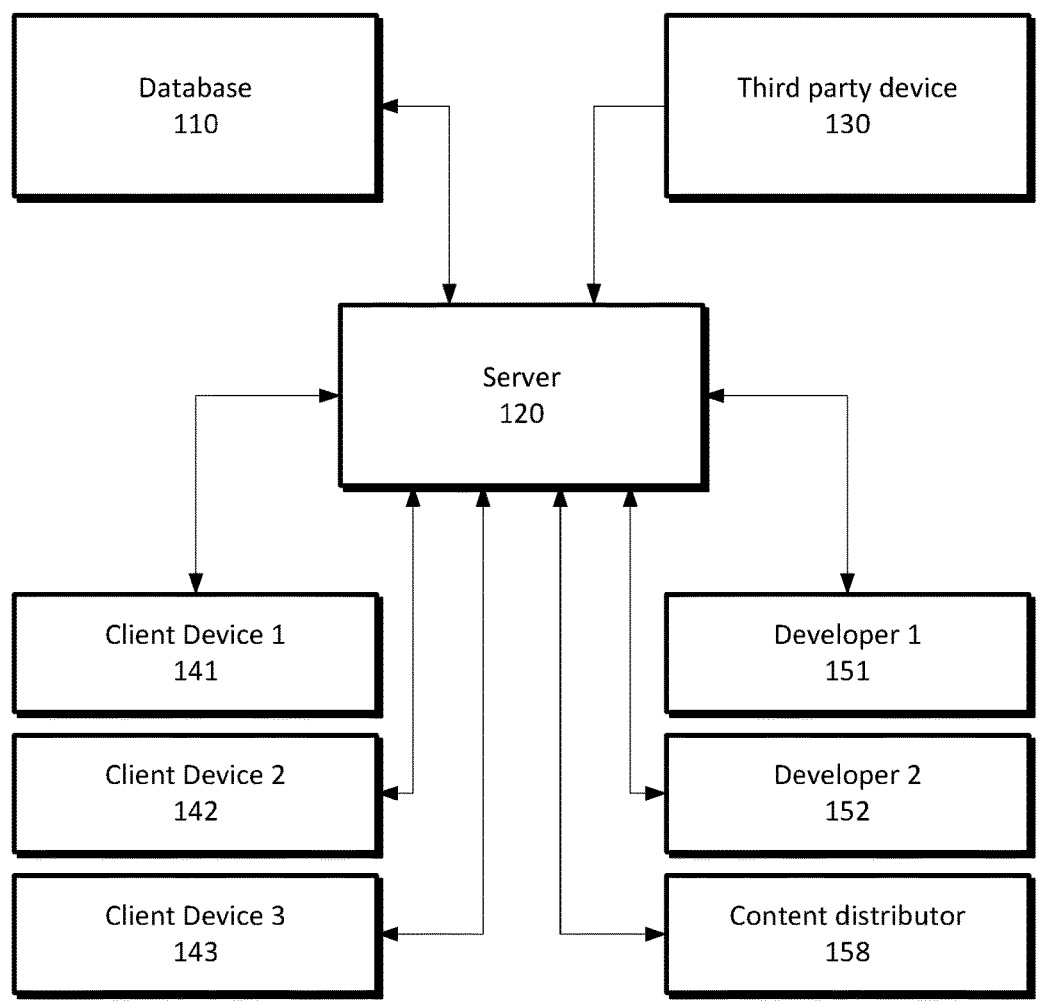
FIG. 1 shows an example configuration of devices that may perform one or more processes involved in the disclosed implementations.

An example collection of devices configured to perform one or more processes involved in the disclosed implementations is provided in FIG. 1. An application store or marketplace may refer to a server that dynamically hosts digital content (e.g., an application, a song/album, a movie, an electronic book, a periodical, etc.) for distribution to one or more user (e.g., client) devices. Digital content hosted by the application store server may be updated, for example, when a developer provides a new version of an application. The application server may be capable of detecting the hardware and software of a client device that has connected to it or receiving an indication thereof. It may filter the digital content based upon the type of client device that has interfaced with it and/or the software contained on the client device, such as the operating system or collection of applications. The application store server may refer to a collection of computer processors that are coupled to one or more databases that store the digital content. A database may store information about each piece of digital content such as a title, an author, a cast, a developer, a version or version history, a rating, an installation number, a download number, a view number, a review, a description, a content rating (e.g., violence contained etc. The database can be updated, for example, as new digital content becomes available, an application update becomes available, to remove content that no longer is desired to be available to client devices, etc. The database may, similarly, associate information regarding users who have installed, downloaded, viewed, or otherwise interacted with content at the direction of the application store.

In some instances, the content may be hosted by the application store server, while in other cases, the application store server may determine an installation package that can be provided to a specific client device or make digital content available for download. The installation package may be modified according to one or more rules that define, for example, the client device's hardware, the client device's software, and/or a processed request from the application store. For example, a processed request by the application store may distinguish between a download package that contains a fully unlocked game and one that is locked after a certain number of levels (e.g., a demo version). Client devices that interface with the application store may browse content hosted by the application store via software operating on the client device.

A third party device 130 may interface with the application store server. The third party device may provide information about users of the application store. For example, a user may have a presence on multiple social networking sites. The third party device may be a server that stores a record of the user's number of followers, frequency of posts, ratings of posts by the user, links to the user's posts and/or profile, sharing of the user's posts, etc. A user may receive a score indicating the user's influence or reputation online. A user who has a high number of posts, followers, and re-sharing of the user's content (e.g., posts) may be deemed more influential than a person who infrequently posts and has few followers. A reputation score may be assigned based on such features.

Generally, a reputation score may measure the reputation of the users that are connected to a specific user, how other users interact with the specific user (e.g., share or link to content of the specific user), and/or how "active" the specific user is online (e.g., number of posts, reviews, etc.). A reputation score may measure the relative level of activity or popularity of a user within a specific context or contexts, such as one or more social media systems, based on a measurement of the user's activity within each system. Non-limiting examples of how a reputation score may be computed are provided below.

A reputation score may be received by the application store server and stored in the database or it may be computed by the server and similarly stored in the database. As an example of how a reputation score may be computed, an average value may be determined for each category of social data (e.g., post count, number of followers, views, re-shares, etc.). For example, it may be determined that an average number of followers for an individual is 100. If a user has 500 followers, the user may be assigned a value of 500/100 or 5 based on the number of followers. Similarly, it may be determined that an average number of re-shares for a particular social network site is 10 per month. The user may have 100 re-shares in a particular month or an average of 100 re-shares of content for a period of time (e.g., over the last year or last week). The user may be assigned a value of 100/10 or 10 for a re-share value. The reputation score may be computed by summing the values for the social data. In this simple example, the user may be assigned a score of 15. Other methods of scoring the social data and combining or manipulating it to ascertain a reputation score may be used in any implementation disclosed herein.

As stated earlier, the reputation score may be based on the reputation of other users who have connected to and/or linked to content from a specific user. For example, user's A, B, and C, may be members of different social networks. The reputation scores for users A, B, and C may be 50, 10, and 20, respectively. The reputation score may indicate that user A is five times more prominent or well known in social media as compared to user B. A re-share of content from user A may be weighted up as compared to user's B and C. The value of the weighting may be varied such that it may not be proportional to the reputation score. For example, a re-share from user A may be twice the value assigned for a re-share of content as compared to user B despite user A having a reputation score that is five times higher than user B. Thus, a user who is connected with and/or whose social network content is shared by high reputation score users will receive a boost to the user's overall reputation score compared to if the same user is connected with and/or has content shared by relatively low reputation score users.

In some configurations, one or more pieces of social data and/or the social network may be weighted to obtain the reputation score. For example, a machine learning technique may be applied to the collected social data from a variety of social networks. A training group of users who are considered influential online may be selected based on one or more features, such as number of followers. The algorithm may be trained on the training group of influential users to extract features that are associated with an influential individual in the online space. Different social networks may provide different mechanisms for a user to share, re-share, view, and discover content. For example, one social network site may limit users to short length textual message, but it may make re-sharing of the message easy and common. In such a case, the re-sharing of content may be predicted to be higher than another social network site that does not enable re-sharing of content in the same way or make it as user friendly. Continuing the above example, the machine algorithm may indicate that re-sharing of content is a poorer indicator of influence on the social network than the number of followers and weight it accordingly (e.g., multiply the re-share value by one half). Similarly, one social network may be deemed more influential than another social network. Thus, values obtained from the more influential network may be weighted up while the values from the other social network may be weighted down.

A first social network may yield a reputation score of 15 and a second social network may yield a reputation score of 10. In some instances, those values may be summed to yield a reputation score of 25 for the user. For example, it may be that a user who has a presence on multiple social networks is more influential than a user who is present on one. The values for the social networks may be manipulated by other methods as well, such as weighting the values or averaging them.

A reputation score may further be modified by comparing a particular user against all other users for whom a score has been computed. For example, a first user may have a reputation score of 20 and a second user may have a reputation score of 40. The relationship of the values utilized to calculate the reputation score may be normalized or weighted such that a direct comparison of the two values for the first user and the second user may indicate that the second user is twice as influential in online presence compared to the first user. In some instances, a further correction may be performed to weight the final reputation score, for example, to normalize it for any unaccounted variables. If most users have a reputation score of 40 and there are few users below 40, then it may indicate that the second user is more than twice as influential as the first user. The reputation scores may be weighted to reflect this accordingly.

Figure 2:
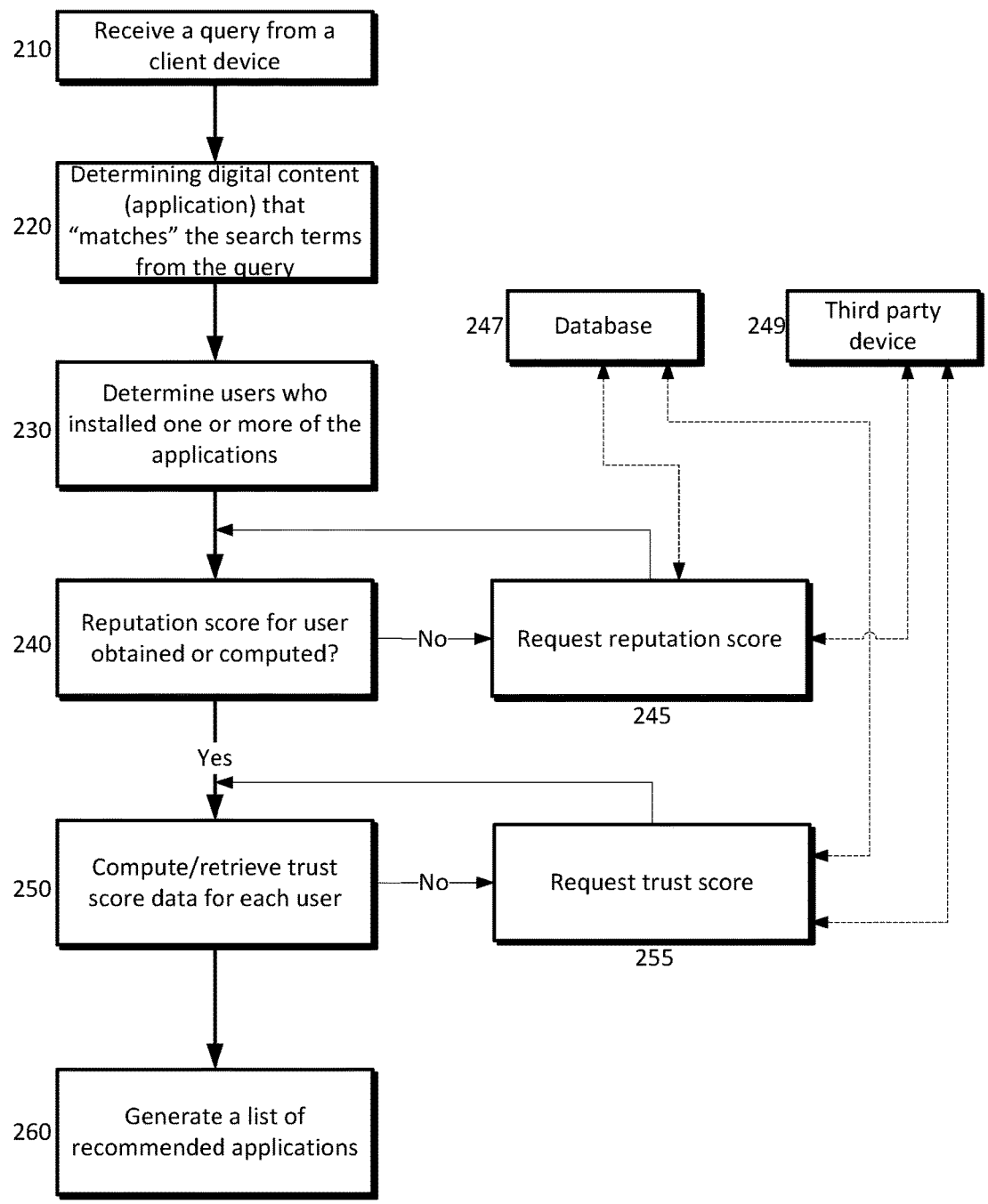
FIG. 2 is an example of a process for generating a list of recommended applications based on one or more of a search term, a reputation score, and a trust score according to an implementation disclosed herein.

In an implementation, an example of which is provided in FIG. 2, a process is described for generating a list of recommended applications based on one or more of a search term, a reputation score, and a trust score. The process may be implemented on circuitry or hardware of an application store server such as that described above and in FIGS. 1 and 5-6. The application store may provide digital content for mobile devices, for example. The application store server may receive one or more search terms from a client device at 210. The client device may refer to a mobile device, a computer, a tablet, etc. The client device, such as a smartphone or tablet, may be associated with a user. Typically a smartphone has a user account that is associated with the user's email account. The user account may contain demographic information about the user, a purchase history, a browse history, a rental history, a download history, an installation history, a credit card number, a wish list, etc. The user account information may be stored in a database connected the application server. The client device may operate an application that interfaces the client device with the application store server. The application may permit the user to browser digital content stored in the database connected to the application store server. Multiple users may simultaneously access, search, browse, download, install, etc. digital content available via the application store server.

At 220, the application store server may determine one or more applications that are associated with the one or more search terms received at 210 based on a word matching technique. A word matching technique may refer to a string matching algorithm or approximate string matching algorithm (a.k.a. fuzzy string matching). Examples of string matching algorithms that may be employed to determine an application that matches one or more of the search terms may be: Knuth-Morris-Pratt algorithm, Boyer-Moore string search algorithm, Apostolico-Giancarlo algorithm Rabin-Karp algorithm, and Aho-Corasick string matching algorithm. Word terms may be associated with an application or other digital content based on a list of keywords provided by a developer or publisher, for example. The word searching technique may compare the received search terms to other textual data associated with the digital content such as a title, a summary or description, a cast, etc. An exact match of a search term to text associated with the digital content is not required. If a user misspelled a word in a search term or the digital content misspelled a word, the word matching technique may be identify the digital content as a "match" even though the match is not entirely accurate. The word search technique may, therefore, identify one or more candidate applications (or other digital content) that "matches" the one or more search terms received at 210.

For each of the candidate applications that were identified at 220, users who installed one or more of the candidate applications may be determined 230. For example, ten applications may have been identified at 220 as matching the received search query terms. The process may begin with the first of the ten applications and determine which users have installed. The application store server may query the database to obtain the installation base for each application identified at 220. In some instances, the data associated with the applications identified at 220 may be provided along with the query response. That is, when the application is identified as matching the query, it may provide an indication of the matching application that includes the user installation base along with other data for the application (e.g., version history, reputation score, trust values, etc.). Thus, the user installation base for each application may be determined. In practice, the installation base for an application may be updated in real time or regular intervals.

At 240, a reputation score for each user who was identified at 230 as having installed one or more of the applications may be computed. As stated earlier with respect to FIG. 1, in some configurations, the reputation score may be computed by and/or received from a third party device. For example, a third party service may have metrics for the social data of a particular user across one or more social network sites and provide an indication of a user's online influence as a reputation score. The third party service may operate on a third party device (e.g., a server). In the event a reputation score is not associated with a user who has installed one of the applications identified at 220, an indication of the user's identity may be utilized to query a database 247 connected to the application store server or a third party device 249. If the third party device provides the reputation score, the database 247 may be updated to indicate the reputation score for the user. Once the score has been obtained for the user, the process at 240 may obtain the reputation score for other users who have installed one or more of the applications at 220. The reputation score may be obtained for one or more social network sites individually or an aggregate reputation score may be computed that is based on two or more social network sites in which a user participates. The aggregate reputation score may be computed by the application store server or received from a third party device. The reputation score, thus, may be similar to a PageRank in that the reputation of the user may be based on the reputation of the other users that connect or have connected to the user.

A trust score for the users who have installed one or more of the applications identified at 220 may be computed or retrieved from the database at 250. A trust score may refer to a degree of separation between the user of the client device that initiated the query at 210 and one of the users identified at 230 who have installed the one or more applications identified at 220. For example, a user's social graph may be stored in a database and/or provided by a third party device. The social graph may provide an indication of a user's friends, followers, connections, etc. A user may have a first friend on a social network site and the user and the friend may share content between one another. The first friend may be deemed to have one degree of separation from the user. If the first friend has a second friend who is not connected to the first user, the second friend may be deemed to be two degrees separated from the user.

While a degree of separation may be one form of a trust score, the trust score may be influenced by other social data such as the amount of re-share content between two users, the number of likes a post of a user receives from a friend or views of the user's content by the friend. For example, the user may not know a third friend who is socially connected to the first friend, but the third friend may be follow of several of the user's posts on a social network site or re-share messages from the user with the third friend's friends. If the first friend's degree of separation to the user is 1 and the second friend's degree of separation to the user is 2, the third friend's degree of separation from the user may be between 1 and 2. Thus, more generally, a trust score may refer to an aggregate of the social data that indicates a connection between a user and other users. The more activities that happen between two users, the stronger the trust score may be. A trust score, similar to a reputation score, may be weighted according to one or more factors that are more indicative of activity between two users such as following a user being a better indication of trust between two users compared to re-sharing content. Further the weighting may be based on the degree of separation. For example, a trust score for a user with respect to a second friend and a third friend in which the second friend is a second degree connection and the third friend is a third degree connection may be weighted respectively, by one half and one third. Thus, if the second friend receives a re-share value as between the second friend and the user of 25, it may be received as a trust factor of 12.5 because the second friend is a second degree connection. As with the reputation score, a value may be assigned for a re-share by computing an average for the number of re-shares between two users of a social network site. Similar techniques may be applied to other social data to assign a value transform an activity between two users into a numerical value. In some instances a user may have a trust factor of zero with another user. This may reflect that neither user has had any interaction with the other user. Among the population of users of the application store, this may be a common trust score for most other users with respect to a single user.

The third party device may provide a portion of the social data which can be utilized to ascertain a trust score. The trust score may be computed prior to the process outlined in FIG. 2. For example, as users become known to the application store server (e.g., by registering a client device, consuming digital content, and/or creating a user account), the application store server may compute, in real time or at predetermined intervals, a trust score for the user in relation to other users. The application store server may connect with a third party device to retrieve social data and/or trust score data. In some configurations, the application store server may connect with other local services to determine the extent of the user's social interactions or social graph. In FIG. 2, if the application store serve cannot compute or did not receive the trust score, it may request the trust score or data necessary for computing the like from the database 247 and/or the third party device 249 at 255.

At 260, a list of recommended applications may be generated based on the applications identified as "matching" the terms received as a request at 210, the reputation score that was computed/received at 240, and the trust score that was computed/received at 250. The generated list of applications or other digital content may be based on a summation of the reputation score and the trust score for the applications identified at 220. Similarly, the reputation score and/or the trust score may be weighted prior to summation to generate the list. The generated list at 260 may be ranked based on a variety of factors such as a popularity metric (e.g., a number of downloads, installs, and/or rentals for the digital content), a content rating (e.g., an age rating for the content), a view count, a number of reviews (e.g., professional reviews and/or user provide reviews and ratings associated therewith), etc.

Some or all of the list of recommended applications may be provided by the application store server to the client device of the user. For example, if the user has interfaced with the application store server via an application, a ranked top ten list may be generated as described above. The client device may receive a selection of one of the recommended applications from the user and convey that selection to the application store server. The application store server may deliver an installation package for the selection application to the client device. An installation package may include program code, resources, assets, certificates, etc. that are necessary to execute, operate, or otherwise consume the content on the client device. The application store may download the application to the client device in some instances. Other forms of digital content may be provided to the client device. For example, a digital movie may be buffered on the client device and an electronic book may be downloaded. Upon successful installation, download, consumption of the digital content, the database may be updated to reflect that the user has installed one of the recommended applications.

Figure 3:
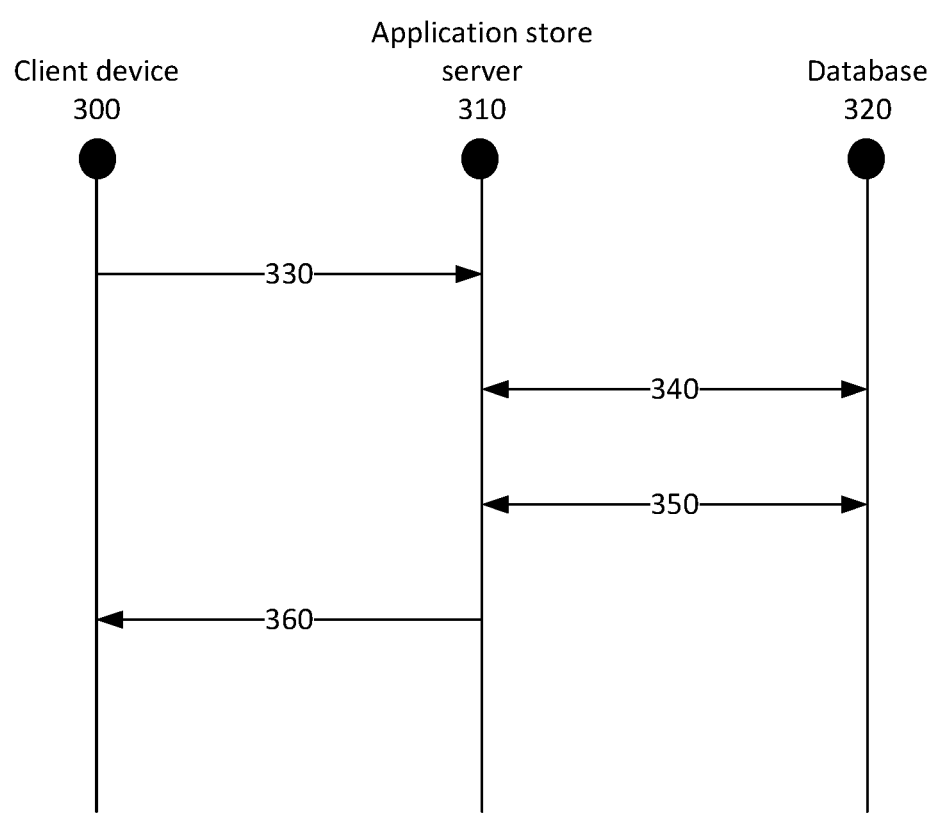
FIG. 3 shows an example of a system for generating a recommended list of digital content as disclosed herein.

A system for generating a recommended list of digital content as shown in the example provided in FIG. 3. The system may include a database 320 for storing digital content and information pertaining to the digital content. Such information may be, for example, users who have installed, downloaded, rented, and/or consumed the digital content, metadata about the digital content (e.g., title, cast, description, etc.), a reputation score, a trust score, etc. Multiple databases may be operationally connected to the application store server 310 and may be represented by the database 320 shown in FIG. 3. A processor of the application store server 310 may be communicatively coupled to the database 320. The application store server may provide digital content for digital distribution to client devices associated with users of the application store. Users may interface with the application store server 310 with software on a client device 300.

The applications store server's 310 processor may receive a search request from a user's client device 300 at 330. As described earlier, the client device 300 may be associated with one or more user accounts and the search request may include an indication of the user or user account that originated the request. The search request may be one or more search terms and may be entered into the client device 300 utilizing a text, voice, or gesture input method. The server 310 may determine one or more applications or other digital content that are associated with the search request (e.g., the term(s)) based on a word matching technique. As described above, the application server may contact the database to perform a comparison of the search term(s) against the textual information contained in the database 320 at 340. The application store server 310 may determine which users have installed any of the identified pieces of digital content identified at 340 as matching one or more of the search terms. In some instances, such information may not be sent in response to the request at 340.

At 350 the application store server may dispatch a request for the users associated with the application(s) identified at 340. In some configurations, a reputation score may be computed at or shortly after the time of the request received at 330. It may be computed prior to the request and stored into the database 320 and updated at periodic intervals. Similarly, a trust score may be computed by the application store server 310 at or shortly after the time of the search request at 330 or it may be computed and/or updated prior to the search request. As stated above, a third party vendor may operate a service that can be utilized to provide or augment the reputation score and/or trust score. The third party vendor data can be request at or shortly after the request.

A list of recommended digital content may be generated based on the digital content associated with the search request, the reputation score, and the trust score as described earlier. The recommended digital content may be provided to the client device 300 at 360. A portion of the list may be presented to the client device 300 and it may be ranked in a variety of ways as described above.

Figure 4:
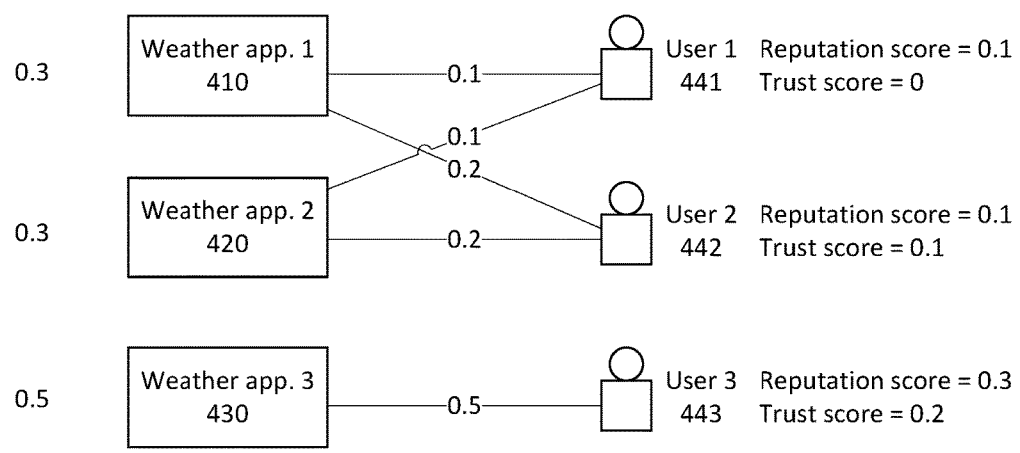
FIG. 4 is an example of a search for a recommended list of weather applications as disclosed herein.

FIG. 4 is an example of a search for a recommended list of weather applications. A user may launch an application on the user's device to interface with the application store and enter a search term such as "weather." As shown in FIG. 4, three weather applications 410, 420, 430 may "match" the search term "weather" in the application store. For each application, one or more users may be associated with it (e.g., installed it on their respective client devices). A reputation score has been computed for each user 441, 442, 443 based on social data, for example, that are known to the application store server. In this case, User 1 441 and User 2 442 have reputation scores of 0.1 while User 3 443 has a reputation score of 0.3, indicating that User 3 443 may have more influence online such as a larger presence online (e.g., more social media posts, more followers, re-shares of content, etc.). A trust score may be computed for each user. In this case, the user who conducted the search may not have any contact or knowledge of User 1 441; thus, User 1 441 has a trust score of 0. User 2 442 may be a second degree connection as indicated by the trust score of 0.1. User 3 443 may also be a second degree connection, but User 3 443 may have content that the user who conducted the search may have "liked" or re-shared. Thus, User 3 443 has a trust score of 0.3. The lines connecting each weather application 410, 420, 430 with one or more users indicates a value that application 410, 420, 430 will receive from each respective user 441, 442, 443. In this example, the composite score for Weather app. 1 410 and Weather app. 2 420 is 0.3 based on the combined reputation score and the trust score of Users 1 441 and 2 442. User 3 443 may not have installed either of those applications and thus, does not contribute to the composite score. User 3 443, who is most "trusted" by the user conducting the search and has the most influence, contributes 0.5 to the composite score of Weather app. 3 430. Thus, if all three applications 410, 420, 430 are returned in response to the query for weather applications and ranked according to the composite score, Weather app. 3 443 may be atop the list despite having a smaller installed base. Other features may be utilized to weight and/or rank applications in addition to the reputation and trust scores (such as the installation base, the view count, ratings, etc. as mentioned earlier).

Figure 5:
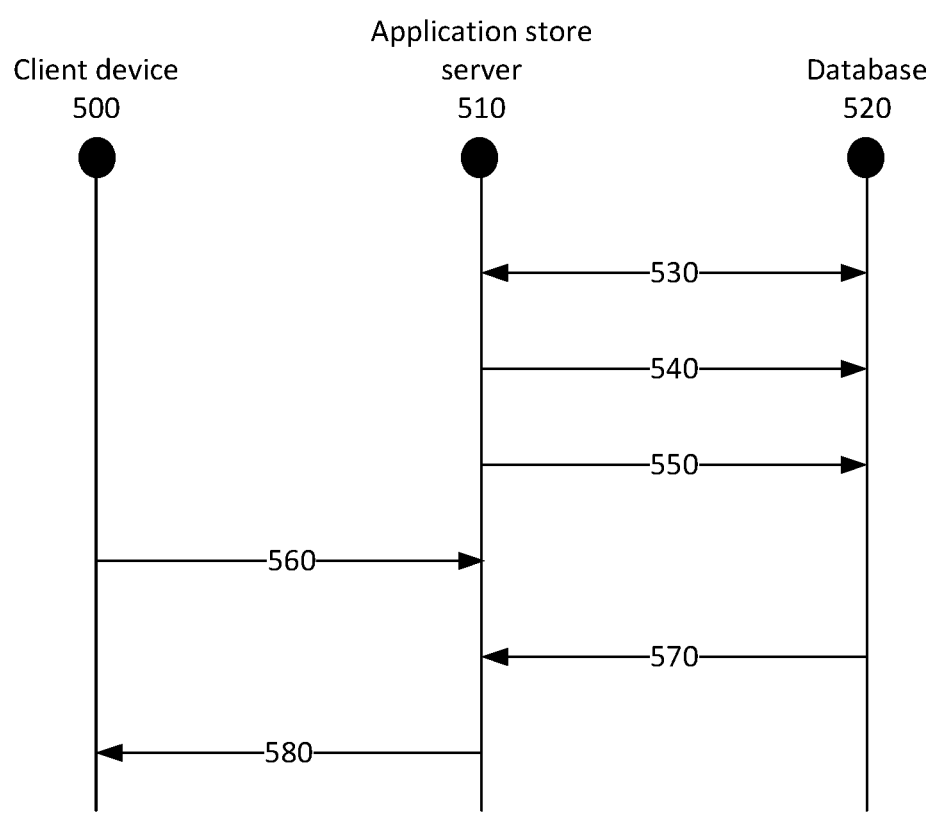
FIG. 5 is an example configuration of a system for generating a reputation score and/or trust score for one or more pieces of digital content as disclosed herein.

In an implementation, a system for generating a reputation score and/or trust score for one or more pieces of digital content is disclosed, as shown by the example provided in FIG. 5. A database 520 may store one or more pieces of digital content as disclosed above. It may store an entry that includes information pertaining to the digital content as described above. A processor of an application store server 510 may be connected to the database 520. The processor may be configured to obtain a reputation score for one or more users of the application store's services (e.g., digital content distribution) at 530. The processor may retrieve a reputation score or social data from which a reputation score can be computed from a third party device as described above.

The server at 510 may utilize the users of its services to establish a link between each of the digital content it provides by determining an installation base of those users who have installed a given application and storing a first indication of the installation base in the database for each application. For example, a database entry may be updated to reflect the user installation base. A reputation score for each user may be determined and, similarly, a trust score may be determined for a given user with respect to other users associated with the application store services. The reputation score and/or trust score may be stored as a second indication 540 and/or a third indication 550, respectively. In some instances, the second indication and third indication may be separately stored in a database and retrieved separately once the installation base for an application is determined as part of a search request. In some configurations, the database entry may include an indication of the reputation and/or trust scores for users who have installed the application. Similarly, the reputation and/or trust scores may be computed and/or received from a third party device instead of the application store server 510.

When a search query is received from a client device 500 at 560 that is associated with a first user, a subset of the applications (or other digital content) may be identified based on a word matching technique as described earlier. For each application, the second and/or third indications may be retrieved from the database 520 at 570. An aggregate score for each of the subset of applications identified may be computed based on at least the reputation score and/or the trust score. In some configurations, the aggregate score may be retrieved from the database 520. The aggregate score may be utilized to rank the subset of the retrieved applications. The client device 500 may be provided with a portion of the subset of retrieved applications in the form of a ranked list at 580, for example. The ranked list may be presented using a variety of textual and/or graphical presentation styles.

Figure 6:
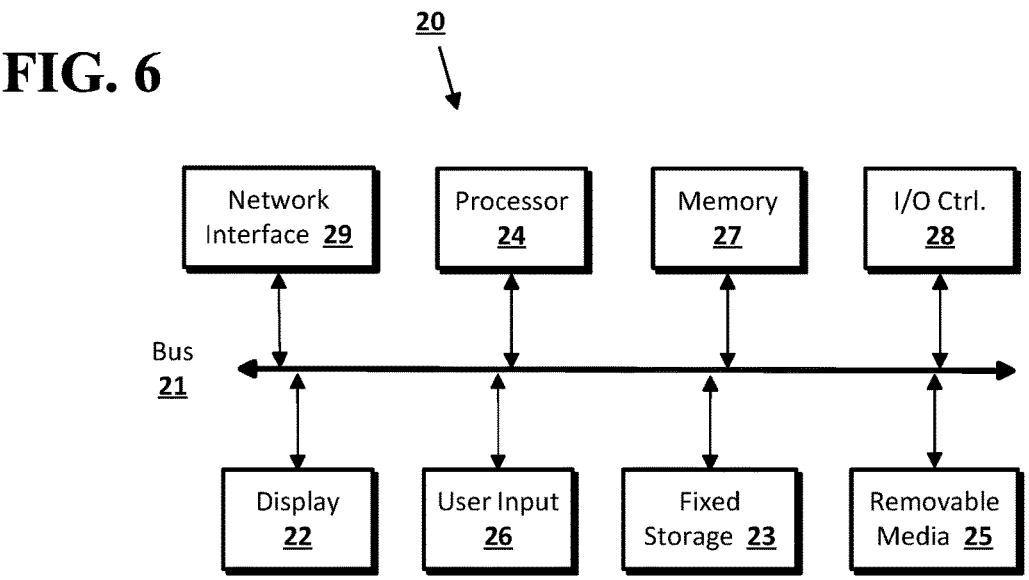
FIG. 6 shows a computer according to an implementation of the disclosed subject matter.

Implementations of the presently disclosed subject matter may be implemented in and used with a variety of component and network architectures. FIG. 6 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 7.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
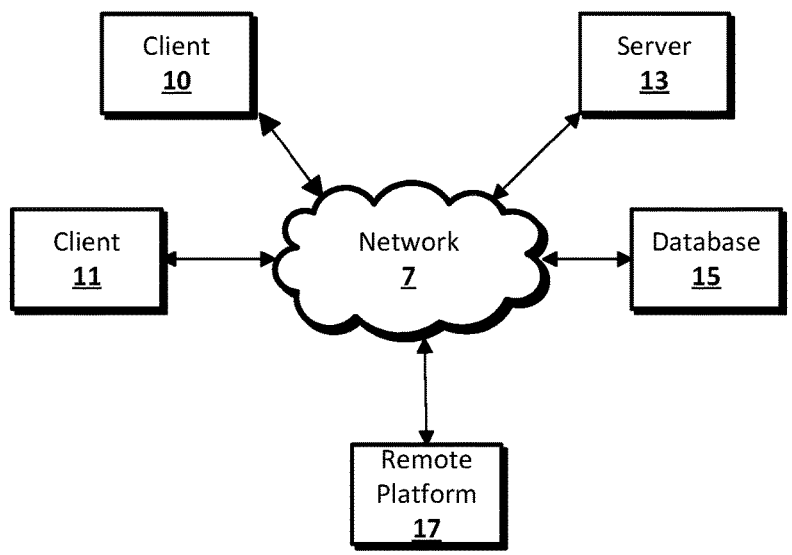
FIG. 7 shows a network configuration according to an implementation of the disclosed subject matter.

FIG. 7 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's provided input, a user's geographic location, and any other similar data associated with a user), or to control whether and/or how to receive data from a provider that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method for generating a list of recommended applications, comprising:
    receiving, by an application store server and from a first client device associated with a first user, a search term;
    determining, by the application store server, a plurality of applications that are associated with the search term;
    identifying, for at least one of the plurality of applications, a second user associated with a second client device on which the at least one of the plurality of applications is installed;
    computing, by the application store server and for the second user, a first score, the first score reflecting at least one of a degree of activity of the second user within a social media system or a degree of popularity of the second user within the social media system, the computing including:
        calculating, for a first category of social media usage data associated with the social media system, an average value of the first category of the social media usage data for a group of users of the social media system; and
        calculating a first quotient by dividing a value of the first category of the social media usage data associated with the second user by the average value of the first category, wherein the first category of the social media usage data comprises one of a degree of activity of a user within the social media system, a degree of popularity of the user within the social media system, a count of posts by the user within the social media system, a number of followers of the user within the social media system, a number of views of the posts by the user within the social media system, or a re-share of the posts by the user within the social media system; and
    generating, based on the first score, the list of recommended applications.

2. The method of claim 1, further comprising determining, by a machine learning technique, the first category.

3. The method of claim 1, further comprising:
    calculating, for a second category of the social media usage data associated with the social media system, an average value of the second category of the social media usage data for the group of users of the social media system;
    calculating a second quotient by dividing a value of the second category of the social media usage data associated with the second user by the average value of the second category; and
    calculating a sum of the first quotient and the second quotient.

4. The method of claim 3, further comprising:
    calculating a first weighted quotient by multiplying the first quotient by a first weight; and
    calculating a second weighted quotient by multiplying the second quotient by a second weight,
    wherein the calculating the sum comprises calculating a sum of the first weighted quotient and the second weighted quotient.

5. The method of claim 4, wherein the first weight is a function of a degree of influence of the second user with respect to at least one other user within the social media system.

6. The method of claim 4, wherein the social media system comprises a first social media system and a second social media system, the first weight comprises a first weight of the first social media system and a first weight of the second social media system, and the first weight of the first social media system is a function of a degree of an ability of the first social media system to perform a function associated with the first category.

7. The method of claim 1, wherein the degree of activity of the second user within the social media system comprises a count of posts by the second user to at least one social network site.

8. The method of claim 1, wherein the degree of popularity of the second user within the social media system comprises a number of followers, on at least one social network site, of the second user.

9. The method of claim 1, further comprising obtaining a second score for the second user, the second score based upon data, maintained by the social media system, that are indicative of a connection between the second user and the first user, wherein the generating the list of recommended applications is further based on the second score.

10. The method of claim 9, wherein the obtaining the second score comprises retrieving, from a third party device, the second score.

11. The method of claim 9, wherein the obtaining the second score comprises computing, by the application store server, the second score.

12. The method of claim 9, wherein the data that are indicative of the connection between the second user and the first user comprise data that are indicative of a degree of separation, within at least one social network site, between the first user and the second user.

13. A non-transitory computer-readable medium storing computer code for controlling a processor to cause the processor to generate a list of recommended applications, the computer code including instructions to cause the processor to:
   receive, from a first client device associated with a first user, a search term;
   determine a plurality of applications that are associated with the search term;
   identify, for at least one of the plurality of applications, a second user associated with a second client device on which the at least one of the plurality of applications is installed;
   compute, for the second user, a first score, the first score reflecting at least one of a degree of activity of the second user within a social media system or a degree of popularity of the second user within the social media system, the instructions to cause the processor to compute including:
      calculate, for a first category of social media usage data associated with the social media system, an average value of the first category of the social media usage data for a group of users of the social media system; and
      calculate a first quotient by dividing a value of the first category of the social media usage data associated with the second user by the average value of the first category, wherein the first category of the social media usage data comprises one of a degree of activity of a user within the social media system, a degree of popularity of the user within the social media system, a count of posts by the user within the social media system, a number of followers of the user within the social media system, a number of views of the posts by the user within the social media system, or a re-share of the posts by the user within the social media system; and
   generate, based on the first score, the list of recommended applications.

14. A system for generating a list of recommended applications, comprising
   a network interface configured to receive, from a first client device associated with a first user, a search term; and
   a processor configured to determine a plurality of applications that are associated with the search term, to identify, for at least one of the plurality of applications, a second user associated with a second client device on which the at least one of the plurality of applications is installed, to compute, for the second user, a first score, the first score reflecting at least one of a degree of activity of the second user within a social media system or a degree of popularity of the second user within the social media system, and to generate, based on the first score, the list of recommended applications,
   wherein the processor is configured to compute the first score by:
      calculating, for a first category of social media usage data associated with the social media system, an average value of the first category of the social media usage data for a group of users of the social media system; and
      calculating a first quotient by dividing a value of the first category of the social media usage data associated with the second user by the average value of the first category, wherein the first category of the social media usage data comprises one of a degree of activity of a user within the social media system, a degree of popularity of the user within the social media system, a count of posts by the user within the social media system, a number of followers of the user within the social media system, a number of views of the posts by the user within the social media system, or a re-share of the posts by the user within the social media system.

* * * * *